United States Patent
Henderson et al.

(10) Patent No.: US 9,528,335 B2
(45) Date of Patent: Dec. 27, 2016

(54) AIR-DRIVEN DEGASSER ASSEMBLY

(71) Applicant: HALLIBURTON ENERGY SERVICES, INC., Houston, TX (US)

(72) Inventors: Matthew Hay Henderson, Inverbervie (GB); Charles Cutler Britton, Houston, TX (US); Neil Patrick Schexnaider, Rayne, LA (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 398 days.

(21) Appl. No.: 14/101,608

(22) Filed: Dec. 10, 2013

(65) Prior Publication Data

US 2014/0338983 A1 Nov. 20, 2014

Related U.S. Application Data

(60) Provisional application No. 61/825,280, filed on May 20, 2013.

(51) Int. Cl.
*E21B 21/16* (2006.01)
*E21B 21/06* (2006.01)
*B01D 19/00* (2006.01)

(52) U.S. Cl.
CPC .......... *E21B 21/16* (2013.01); *B01D 19/0026* (2013.01); *B01D 19/0094* (2013.01); *E21B 21/067* (2013.01)

(58) Field of Classification Search
CPC .. E21B 21/067; E21B 21/01; E21B 2021/007; B01D 19/0094; B01D 19/0026; B01D 19/0052

See application file for complete search history.

(56) References Cited

U.S. PATENT DOCUMENTS

| | | | | |
|---|---|---|---|---|
| 2,704,658 A | * | 3/1955 | Gordon | B01F 7/22 175/206 |
| 3,055,743 A | * | 9/1962 | Anderson | E21B 49/005 366/279 |
| 3,229,445 A | * | 1/1966 | Kraft | B01D 19/0026 165/132 |
| 3,334,674 A | * | 8/1967 | Hughes | A22C 11/02 99/472 |
| 3,768,726 A | * | 10/1973 | Hale | B01D 19/0052 494/10 |
| 3,769,779 A | * | 11/1973 | Liljestrand | B01D 19/0047 96/161 |

(Continued)

OTHER PUBLICATIONS

PCT International Search Report and Written Opinion, dated Aug. 26, 2014, Appl No. PCT/US2014/036618, "Improved Air-driven Degasser Assembly," Filed May 2, 2014, 15 pgs.

(Continued)

*Primary Examiner* — Jennifer H Gay
(74) *Attorney, Agent, or Firm* — Iselin Law PLLC; John W. Wustenberg

(57) ABSTRACT

Degasser assemblies, systems and methods, including an air-driven degasser assembly that includes a degasser having a drive shaft with a seal that inhibits intrusion of ambient air and an air motor having a motor shaft that drives the drive shaft. The motor shaft is distinct from or integral to the drive shaft, and the air motor is positioned to direct air leakage around the motor shaft away from the seal.

18 Claims, 3 Drawing Sheets

(56) References Cited

U.S. PATENT DOCUMENTS

| | | | | |
|---|---|---|---|---|
| 3,831,352 | A * | 8/1974 | Parcels | E21B 21/067 96/196 |
| 3,973,930 | A * | 8/1976 | Burgess | E21B 21/067 95/261 |
| 4,046,528 | A * | 9/1977 | Liljestrand | E21B 21/067 96/196 |
| 4,084,946 | A * | 4/1978 | Burgess | E21B 21/067 55/406 |
| 4,272,258 | A * | 6/1981 | Shifflett | E21B 21/067 55/348 |
| 4,326,863 | A * | 4/1982 | Day | B01D 19/0052 55/408 |
| 4,358,298 | A * | 11/1982 | Ratcliff | E21B 21/067 366/137 |
| 4,365,977 | A * | 12/1982 | Egbert | E21B 21/067 95/248 |
| 4,416,672 | A * | 11/1983 | Underwood | E21B 21/067 55/435 |
| 4,668,251 | A * | 5/1987 | Burgess | E21B 21/067 96/174 |
| 5,199,509 | A * | 4/1993 | Wright | B01D 19/0052 175/206 |
| 5,648,603 | A * | 7/1997 | Hanson | B01D 19/0057 73/152.02 |
| 6,389,878 | B1 * | 5/2002 | Zamfes | B01D 19/0052 73/152.04 |
| 6,629,821 | B1 * | 10/2003 | Yokota | F04D 9/003 417/199.1 |
| 6,666,099 | B2 * | 12/2003 | Taylor | G01N 33/2823 73/863.12 |
| 7,392,138 | B2 | 6/2008 | Frechin et al. | |
| 7,779,667 | B2 * | 8/2010 | Evrard | B01D 19/0063 73/19.01 |
| 8,584,518 | B2 * | 11/2013 | Phillips | B01D 19/0052 73/152.04 |
| 8,632,625 | B2 * | 1/2014 | DeGreeve | B01D 19/0042 95/260 |
| 8,966,955 | B2 * | 3/2015 | Henderson | B01D 19/0052 73/19.09 |
| 2002/0178842 | A1 * | 12/2002 | Taylor | G01N 33/2823 73/863.12 |
| 2006/0254421 | A1 * | 11/2006 | Boone | E21B 21/067 95/260 |
| 2009/0199618 | A1 * | 8/2009 | Evrard | B01D 19/0063 73/19.09 |
| 2011/0219853 | A1 * | 9/2011 | Henderson | B01D 19/0052 73/23.2 |
| 2012/0000278 | A1 * | 1/2012 | Phillips | B01D 19/0052 73/152.04 |
| 2014/0338983 | A1 * | 11/2014 | Henderson | E21B 21/16 175/84 |
| 2014/0369860 | A1 * | 12/2014 | Thut | F04D 29/086 417/72 |

OTHER PUBLICATIONS

PCT International Preliminary Report on Patentability, dated Dec. 3, 2015, Appl No. PCT/US2014/036618, "Improved Air-driven Degasser Assembly," Filed May 2, 2014, 12 pgs.

* cited by examiner

FIG. 1
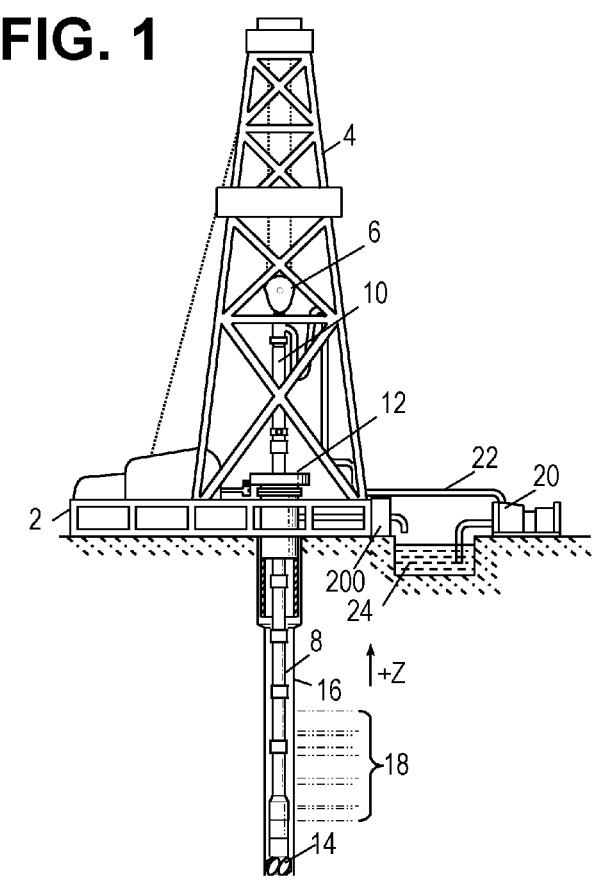
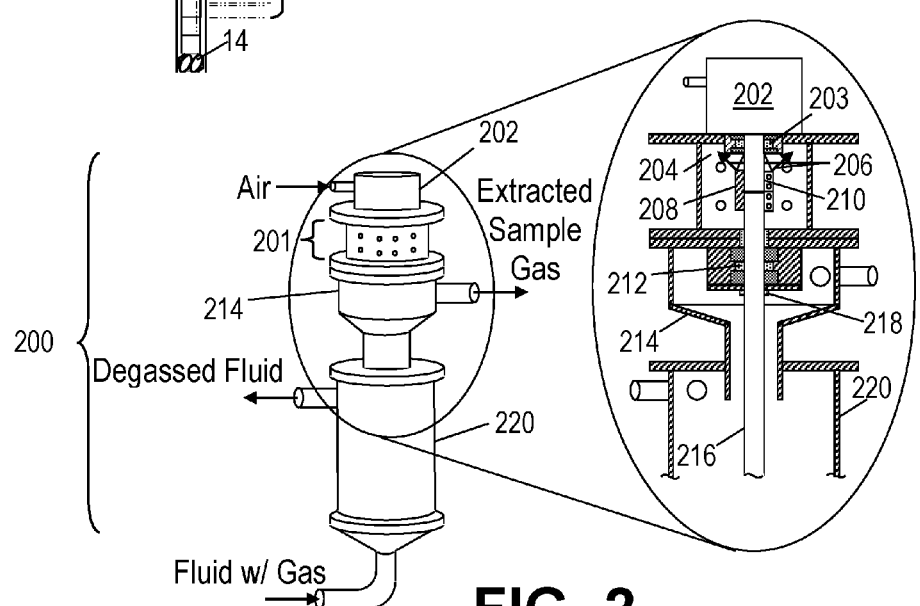
FIG. 2

AIR-DRIVEN DEGASSER ASSEMBLY

CROSS-REFERENCE TO RELATED APPLICATION

This application claims priority to Provisional U.S. Application Ser. No. 61/825,280, titled "Degasser Air Motor Separated Mounting" and filed May 20, 2013 by Matthew Hay Henderson, Charles Cutler Britton and Neil Patrick Schexnaider, which is incorporated herein by reference.

BACKGROUND

As the demand for oil and gas has continued to increase, oil field operators have had to drill increasingly deeper wells to meet this demand. One of the elements of a drilling operation that makes such deep wells feasible is drilling fluid. Drilling fluid or "mud" is typically injected down into a drill pipe, through the drill bit and back up the borehole in the annulus formed between the borehole wall and the exterior of the drill pipe. The fluid provides drill bit lubrication and cooling, controls the borehole pressure, stabilizes the borehole wall and carries drilling cuttings up and away from the bottom of the borehole. The fluid typically flows in a closed loop, wherein the fluid is filtered to remove cuttings and other impurities before it is re-injected into the borehole.

As drilling progresses, gasses from the surrounding formation may be released into the drilling fluid, forming bubbles within the fluid. Operators will sometimes separate out the gases from the fluid to measure and analyze the hydrocarbons present in the extracted sample gas. Such separation is performed by a motor-driven drilling fluid degasser. Because of the presence of flammable gases, air motors are generally used to drive the degasser rather than more expensive explosion-proof electric motors. Such motors are typically directly mounted to the degasser in order to reduce the amount of space needed by the degasser/motor assembly, reduce the level of vibration produced by the operation of the assembly and reduce the number of assembly components.

As a result of being driven at high pressures and/or high flow rates, air motors typically leak, allowing air to escape from seals around the output shaft. These air leaks can increase if the shaft surface becomes worn due to debris or inadequate lubrication. While such leaks are considered normal for air motors, the inventors have observed that they present a significant drawback when an air motor drives a degasser. Because the motor is mounted directly to the degasser chamber, air can leak from the motor into the degasser chamber where it mixes with the extracted sample gas. This addition of an unknown quantity of air dilutes the extracted sample gas by an undetermined amount. Further, because the air used to drive an air motor is mixed with lubricating oil, additional contamination can occur and add to the error in the measurement of hydrocarbons within the gas stream. To aggravate matters even further, the direct mounting of the motor prevents operation and maintenance personnel from detecting a leak until the degasser is disassembled and the motor shaft is tested for leaks. Although these problems have long been recognized, the inherent limitations of existing degasser designs have prevented the development of viable, practical solutions.

BRIEF DESCRIPTION OF THE DRAWINGS

Accordingly, there is disclosed herein a novel degasser drive configuration that isolates the degasser seals from impinging air motor leaks. In the drawings:

FIG. 1 shows an illustrative drilling environment.
FIG. 2 shows an illustrative air motor and degasser chamber assembly.

Figure 3A:
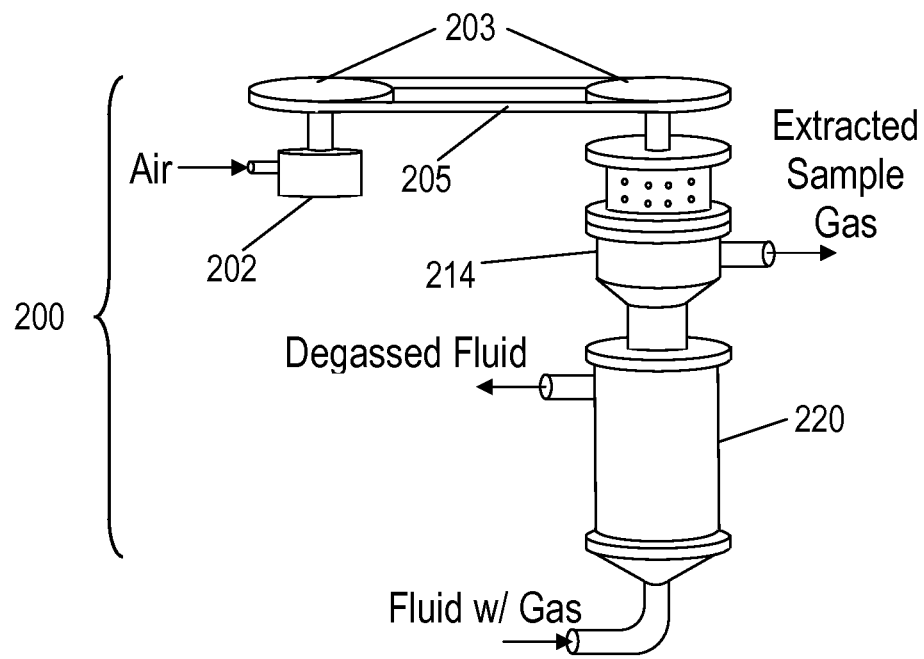
FIGS. 3A and 3B show alternative air-driven degasser assemblies.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The disclosed systems are best understood when described in an illustrative usage context. Accordingly, FIG. 1 shows an illustrative drilling environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, through degasser assembly 200 and into a retention pit 24. The drilling fluid transports cuttings from the borehole into the pit 24 and aids in maintaining the borehole integrity.

As shown in FIG. 1, drilling fluid exiting borehole 16 flows through degasser assembly 200, where gases entrained in the drilling fluid are separated out for measurement. FIG. 2 shows an illustrative embodiment of degasser assembly 200. Compressed air flows into air motor 202, which drives the degasser (e.g., driving an impeller of an atmospheric degasser). Air motor 202 is mounted such that it is spaced away from the end of upper degasser chamber 214, leaving an air gap 201 between the motor and degasser into which leaking air 206 is released. Coupling 208 couples air motor shaft 210 to degasser shaft 216, which extends into degasser lower chamber 220. The shaft segments and coupling within the air gap 201 between air motor 202 and upper degasser chamber 214 are surrounded by guard 204 (e.g., a mesh or ventilated cover), which shields the exposed rotating components while also protecting personnel working nearby. In at least some illustrative embodiments, the spacing between the air motor 202 and the degasser assembly 200 is at least 5 centimeters.

As can be seen in FIG. 2, when leaking air 206 escapes from air motor 202, the air leaks past a seal 203 around shaft 210, into the space behind guard 204 and through small holes in the guard. In this manner the leaking air 206 is released into the air surrounding degasser assembly 200 rather than into the degasser. Still, leaking air 206 can under at least some circumstances take the form of a directed air stream that if allowed to impinge on degasser shaft seals 212 could still potentially force air past seals 212 and contaminate the air in the degasser. To help prevent this, in at least some illustrative embodiments a diverter is positioned along shaft 210 and/or shaft 216 to disrupt and/or redirect leaking air 206.

In the example of FIG. 2, coupling 208 may further operate as said diverter, directing the leaking air 206 away from degasser shaft seals 212 of degasser assembly 200. In other illustrative embodiments, a dedicated diverter is attached to at least one of the shafts and is shaped to direct leaking air away from degasser shaft seals 212. Such a diverter may be formed into any of a number of shapes, including but not limited to a cylinder or a prism, either of which may be tapered. For non-tapered diverters, such as coupling 208 of FIG. 2, the flat surface at the end facing the air motor disrupts and/or redirects air 206. For a tapered diverter, the diameter of the diverter increases with increased distance along shaft from air motor 202, causing the sides of the diverter to redirect leaking air 206 away from the degasser shaft seals 212 as the air moves along the shaft. In at least some illustrative embodiments, the maximum diameter of the diverter is at least twice that of the shaft. The diverter may be constructed of any of a number of different materials, but preferably materials similar to those of the shaft (e.g., stainless steel) that are resistant to chemical reactions with the fluids (liquid and gas) both introduced from the surface and extracted from downhole during drilling operations.

Degasser shaft seals 212 maintain a seal around degasser shaft 216 where it exits upper degasser chamber 214 to prevent gasses from escaping and to inhibit intrusion of ambient air into the degasser. Wiper 218 reduces fluid migration to the sealing surfaces. In at least some illustrative embodiments, sealed bearings are used to retain lubricating grease and provide low pressure difference air sealing (e.g., at or below 5 inches of water or 0.2 psi). By releasing leaked air 206 into the air, redirecting it away from degasser shaft seals 212 and avoiding injecting it into the degasser, the dilution and contamination effects that leaked air 206 would have on the separated gas are avoided, thus ensuring the integrity of the gas samples provided by the degasser.

Figure 3B:
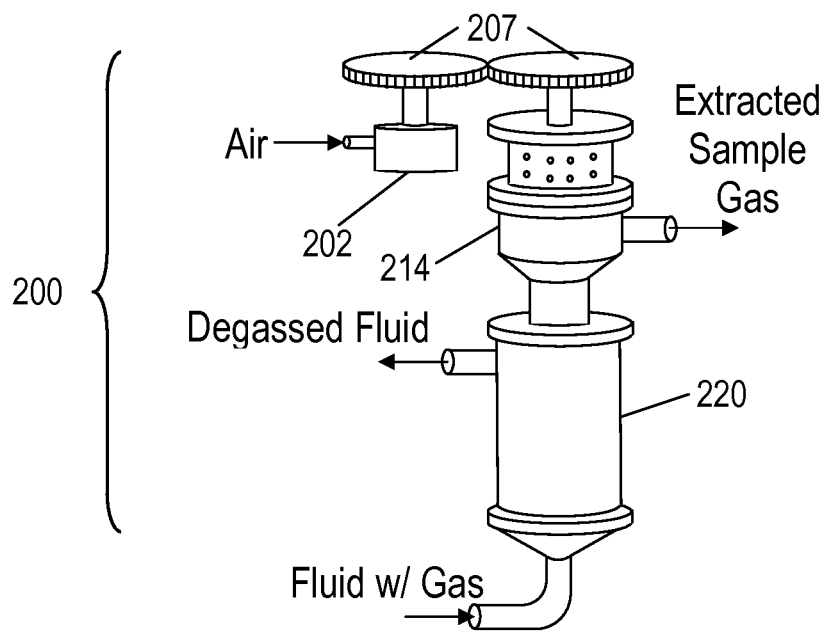

Although the embodiment of FIG. 2 shows two drive shafts coupled to each other to each other by coupling 208, other embodiments may use a single shaft where the motor shaft is integral to the drive shaft, or multiple individual shafts coupled to each other using a variety of different coupling mechanisms. For example, in at least one illustrative embodiment a single shaft couples the air motor to the degasser assembly, and a diverter is mounted along the shaft to direct leaking air away from the degasser assembly's shaft seals. In other illustrative embodiments, the air motor and degasser assembly each have at least one shaft and are positioned side-by-side (i.e., transversally displaced relative to each other) as shown in FIGS. 3A and 3B. In such embodiments, pulleys 203 are mounted to the drive shafts and belts and/or chains 205 couple the drive shafts of the air motor and degasser to each other. Still other embodiments use one or more gears 207, wherein the gear(s) couple to each other and/or to splines in the drive shaft(s). Many other configurations that maintain the air motor and degasser assembly spaced away from each other will become apparent to those of ordinary skill in the art, and all such configurations are within the scope of the present disclosure.

Referring again to FIG. 2, the air motor and degasser shown further enable workers to inspect the air motor shaft for leaks without the need to separate the air motor from the degasser, reducing the overall labor associated with such inspections. In at least some illustrative embodiments, stand-offs (not shown) between air motor 202 and upper degasser chamber 214 provide the mounting points for air motor 202, thus allowing removal of guard 204 as needed to inspect air motor 202 for leaks. This permits the air motor to be inspected without taking the unit out of service.

Figure 4:
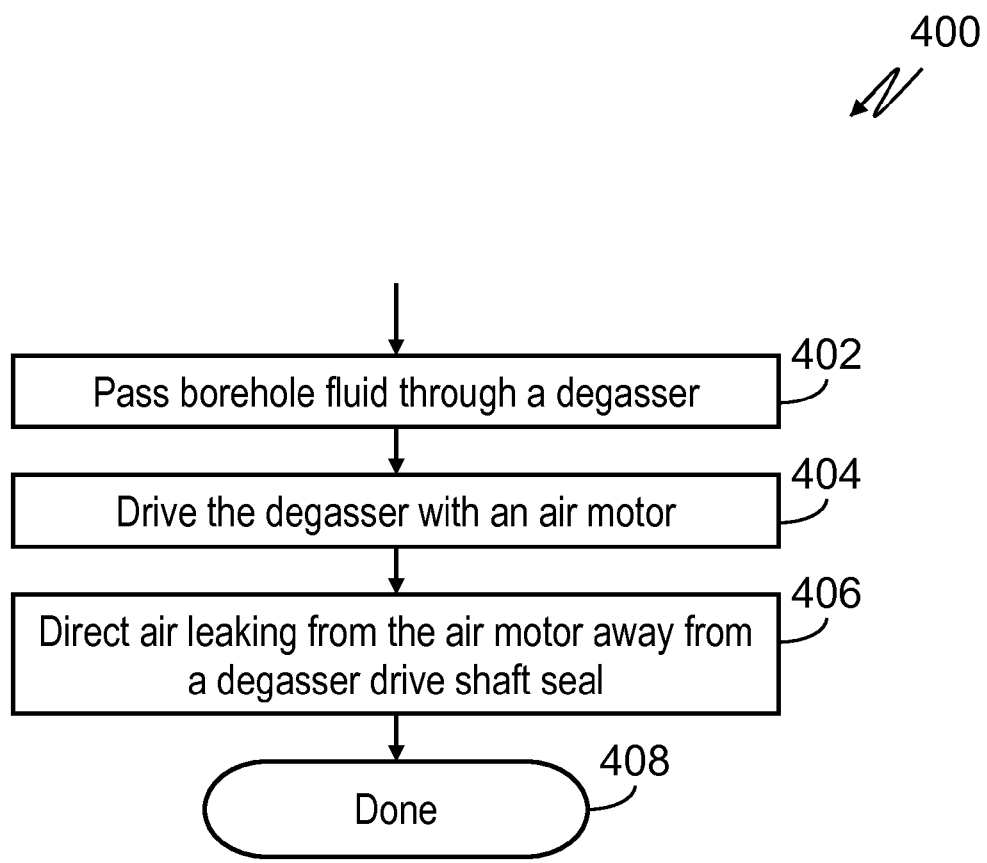
FIG. 4 shows a flow diagram of an illustrative degassing method.

FIG. 4 shows an illustrative method 400 for degassing borehole fluid using the above-described degassers. The method starts by passing borehole fluid through a degasser (block 402), e.g., by pumping drilling fluid down a drillstring, back up between the drillstring and casing of a borehole and through the degasser, as shown in FIG. 1. The degasser is driven with an air motor (block 404), which causes the degasser to separate the gasses entrained in the borehole fluid and allows the gasses to be collected and/or analyzed. During operation of the degasser, air leaking from the air motor is directed away from the degasser drive shaft seal (block 406) using any of the previously described configurations and/or diverters, thus completing the method (block 408).

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An air-driven degasser assembly that comprises:
   a degasser having a drive shaft with a seal that inhibits intrusion of ambient air; and
   an air motor having a motor shaft that drives the drive shaft,
   wherein the motor shaft is distinct from or integral to the drive shaft, and
   wherein the air motor is positioned to direct air leakage around the motor shaft away from the seal and into the ambient air outside of the degasser assembly.

2. The assembly of claim 1, wherein the air motor includes a seal around the motor shaft, and wherein the air motor seal and the degasser seal are axially aligned.

3. The assembly of claim 2, wherein the motor shaft is integral to the drive shaft.

4. The assembly of claim 2, wherein the motor shaft is attached to the drive shaft with a coupler.

5. The assembly of claim 2, wherein a separation between the seals is enclosed by a mesh or a ventilated cover to protect personnel while facilitating escape of the air leakage.

6. The assembly of claim 1, wherein the motor shaft and the drive shaft are transversely displaced and operatively coupled by a gear arrangement.

7. The assembly of claim 1, wherein the motor shaft and the drive shaft are transversely displaced and operatively coupled by a belt or a chain drive arrangement.

8. A drilling system that comprises:
   a drillstring;
   a casing within at least a portion of a borehole created by the drillstring;
   a drilling fluid pump hydraulically coupled to the drillstring that pumps drilling fluid through the drillstring and between the drillstring and casing; and
   an air-driven degasser assembly hydraulically coupled to the casing, the assembly comprising:
      a degasser having a drive shaft with a seal that inhibits intrusion of ambient air; and
      an air motor having a motor shaft that drives the drive shaft,
      wherein the motor shaft is distinct from or integral to the drive shaft, and
      wherein the air motor is positioned to direct air leakage around the motor shaft away from the seal and into the ambient air outside of the degasser assembly.

9. The system of claim 8, wherein the air motor includes a seal around the motor shaft, and wherein the air motor seal and the degasser seal are axially aligned.

10. The system of claim 9, wherein the motor shaft is integral to the drive shaft.

11. The system of claim 9, wherein the motor shaft is attached to the drive shaft with a coupler.

12. The system of claim 9, wherein a separation between the seals is enclosed by a mesh or a ventilated cover to protect personnel while facilitating escape of the air leakage.

13. The system of claim 8, wherein the motor shaft and the drive shaft are transversely displaced and operatively coupled by a gear arrangement.

14. The system of claim 8, wherein the motor shaft and the drive shaft are transversely displaced and operatively coupled by a belt or a chain drive arrangement.

15. A method for degassing borehole fluid, the method comprising:
   passing borehole fluid through a degasser having a drive shaft with a seal that inhibits intrusion of ambient air;
   driving the degasser with an air motor via a motor shaft that is distinct from or integral to the drive shaft; and
   directing air leakage around the motor shaft away from the seal and into the ambient air outside of a degasser assembly, said degasser assembly comprising the degasser and the air motor.

16. The method of claim 15, wherein said directing includes venting the air leakage away via a gap between the degasser seal and an air motor seal.

17. The method of claim 15, wherein the motor shaft is transversely displaced from the drive shaft, and wherein said driving is performed via a gear arrangement.

18. The method of claim 15, wherein the motor shaft is transversely displaced from the drive shaft, and wherein said driving is performed via a chain or belt drive arrangement.

* * * * *